United States Patent [19]

Miyoshi et al.

[11] Patent Number: 4,690,863

[45] Date of Patent: Sep. 1, 1987

[54] MAGNETIC RECORDING MEDIA AND PROCESS FOR PRODUCING SAME

[75] Inventors: Takahito Miyoshi, Odawara; Masaaki Fujiyama, Minami-ashigara; Akihiro Matsufuji; Nobuyuki Yamamoto, both of Odawara, all of Japan

[73] Assignee: Fuji Photo Film Co., Ltd., Kanagawa, Japan

[21] Appl. No.: 744,567

[22] Filed: Jun. 14, 1985

[30] Foreign Application Priority Data

Jun. 21, 1984 [JP] Japan ................................. 59-126349

[51] Int. Cl.$^4$ .............................................. G11B 5/714
[52] U.S. Cl. ................................. 428/328; 252/62.54; 427/128; 428/329; 428/425.9; 428/522; 428/532; 428/694; 428/900
[58] Field of Search ............... 428/694, 695, 900, 328, 428/329, 403, 425.9, 532, 522; 252/62.54; 427/128; 360/134–136

[56] References Cited

U.S. PATENT DOCUMENTS

| | | | |
|---|---|---|---|
| 4,076,861 | 2/1978 | Furukawa | 252/62.54 |
| 4,511,484 | 4/1985 | Anonuma | 252/62.54 |
| 4,537,833 | 8/1985 | Kasuga | 428/328 |
| 4,555,431 | 11/1985 | Miyatsuka | 428/328 |
| 4,613,545 | 9/1986 | Chubachi | 428/328 |
| 4,632,868 | 12/1986 | Miyoshi | 428/328 |

*Primary Examiner*—Ellis P. Robinson
*Attorney, Agent, or Firm*—Burns, Doane, Swecker & Mathis

[57] ABSTRACT

A magnetic recording media comprising a nonmagnetic supporting substrate and a ferromagnetic alloy powder-containing magnetic layer applied onto the surface thereof is produced by:

pre-dispersing a ferromagnetic alloy powder with and in a binder, said alloy having a specific surface area ($S_{BET}$) of no less than 45 m$^2$/g and an absorbed water content of no higher than 1.2% by weight resulting in a pre-dispersion;

mixing and dispersing an additional binder with and in the pre-dispersion; and coating the resultant mixed and dispersed magnetic coating liquid onto said nonmagnetic supporting substrate.

10 Claims, No Drawings

MAGNETIC RECORDING MEDIA AND PROCESS FOR PRODUCING SAME

FIELD OF INDUSTRIAL UTILIZATION

The present invention relates to a magnetic recording medium and a process for producing same, and is more particularly concerned with a magnetic recording medium including a ferromagnetic alloy powder having a favorable dispersibility and possessing a high loop squareness index and a high S/N ratio and a process for producing same.

BACKGROUND

In recent years, magnetic recording media (hereinafter referred to as the magnetic tapes) have been required to possess high properties, and various improvements have been introduced. One of these properties is the loop squareness index or S/N ratio. As one means for enhancing the loop squareness index and S/N ratio of the magnetic tapes of the coating type, it has been considered to use a feromagnetic alloy powder having a reduced grain size and an increased specific surface area. In this case, it is required to disperse the ferromagnetic alloy powders uniformly in the binder and smooth the surface of the coated magnetic layer. However, difficulty is involved in a uniform dispersion of the ferromagnetic alloy powders in the binder, if the powders have a reduced grain size, resulting in deteriorations of the orientation properties of the ferromagnetic alloy powders, the surface smoothness of the magnetic layer, etc. This may prevent excellent loop squareness index and S/N from being. There is also a tendency to accelerate the wear of the reproducing head.

SUMMARY OF THE DISCLOSURE

In order to improve the dispersibility of the ferromagnetic alloy powders, general investigations have been heretofore made of various binder dispersing aids and kneading methods using various kneaders (for instance, two-roll mills, three-roll mills, open kneaders, pressing kneaders, or continuous kneaders).

With any kneader, however, it was very difficult to obtain coating liquids having a desired extent of dispersion reaching the given level.

In addition, it was found that, the smaller the grain size of the magnetic alloy powder, the stronger that tendency.

Accordingly, it is an object of the present invention to provide a magnetic recording medium including a ferromagnetic alloy powder having a favorable dispersibility and possessing a high loop squareness index and an excellent S/N ratio and a process for producing it.

Further objects of the present invention will become apparent in the entire disclosure.

As a result of intensive and extensive studies made of the dispersion method and the physical properties of ferromagnetic alloy powders so as to eliminate the aforesaid problems, the present inventors have discovered that, when a finely divided ferromagnetic powder having a large specific surface area is kneaded with a binder, sufficient kneading and dispersion becomes impossible, unless the magnetic powdery alloy has an absorbed water content of no higher than a predetermined value, and have accomplished the present invention.

The aforesaid object of the present invention is achieved by the provision of (1) a magnetic recording medium comprising a nonmagnetic supporting substrate and a ferromagnetic alloy powder-containing magnetic layer applied to the surface thereof, characterized in that said ferromagnetic alloy powder to be used has a specific surface area ($S_{BET}$) of no less than 45 $m^2/g$, preferably no less than 50 $m^2/g$, and an absorbed water content of no higher than 1.2% by weight, preferably 0.1 to 1.2% by weight and more preferably 0.1 to 1.0% by weight.

The foregoing object is also achieved by the provision of (2) a process for producing such a magnetic recording medium comprising a nonmagnetic supporting substrate and a ferromagnetic alloy powder-containing magnetic layer applied over the surface thereof, characterized by comprising the steps of:

pre-dispersing a ferromagnetic alloy powder with and in a binder or a solvent, said alloy powder having a specific surfae area ($S_{BET}$) of no less than 45 $m^2/g$, preferably no less than 50 $m^2/g$ and an absorbed water content of no higher than 1.2% by weight, preferably 0.1 to 1.2% by weight and more preferably 0.1 to 1.0% by weight resulting in a pre-dispersion;

mixing and dispersing an additional binder with and in the pre-dispersion; and coating the resultant mixed and dispersed magnetic coating liquid onto said nonmagnetic supporting substrate.

PREFERRED EMBODIMENTS OF THE INVENTION

The ferromagnetic alloy powders used for the magnetic layer of the present invention have a metal component of no less than 75% by weight, 80% by weight or more of which metal component is at least one ferromagnetic metal (viz., Fe, Co, Ni, Fe-Co, Fe-Ni,Co-Ni, or Co-NI-Fe), and the remainder (no more than 20% by weight) of which has a composition of Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P and the like and, in some cases, may contain small amounts of water, hydroxides or oxides.

Such ferromagnetic alloy powders may be prepared by the methods which follow and are well-known in the art.

(1) Decomposition of organic acid salts of ferromagnetic metals by heating, followed by reduction thereof with a reducing gas.

(2) Reduction, in a reducing gas, of acicular oxyhydroxides with or without other metals, or acicular iron oxides obtained by heating such oxyhydroxides.

(3) Thermal decomposition of metal carbonyl compounds.

(4) Evaporation at ferromagnetic metals in an inert gas of low pressure.

(5) Reduction of metals capable of forming ferromagnetic bodies in aqueous solutions of their salts with reducing substances (e.g., hydrogenated boron compounds, hypophosphites, hydrazine or the like), thereby obtaining ferromagnetic metal powders.

(6) Electrolytic deposition of ferromagnetic metal powders with the use of a silver cathode, followed by separation of silver.

Although no critical limitation is imposed upon the shape of the ferromagnetic alloy powders, acicular powders having a length of no longer than 0.3 microns are usually employed. The term "water content" used in the present disclosure refers to a water content measured with the application of the principle of water content measurement according to the Karl Fischer method. Adjustment of the water content may be effected by the methods heretofore known in the art, and may, for instance, be achieved by heating and drying ferromagnetic alloy powders pulverized to the given particle size in an inert gas such as nitrogen.

Uniform kneading of a finely pulverized magnetic body comprised of the ferromagnetic alloy powders having a specific surface area ($S_{BET}$) of no less than 45 $m^2/g$ with a binder may be achieved by pre-dispersion with kneaders designed to produce a shearing force such as two-roll mills, three-roll mills, open kneaders, pressing kneaders or continuous kneaders, and post-dispersion with a sand grinder or ball mill.

Magnetic tapes prepared using a coating liquid obtained from the ferromagnetic alloy powders having a water content within above-mentioned range are high in the loop squareness index and glossiness and, hence, the S/N ratio.

In the event that the water content exceeds the upper limit of the aforesaid range, the water moisture present in excess on the surface of the ferromagnetic alloy powders reacts rapidly with the isocyanate compound to be added in the final step of the coating liquid. For that reason, no uniform binder layer is formed on the surface of said powdery alloy, thus resulting in a lowering of dispersibility. Reduction in the pot life of the coating liquid also takes place. Hence, the magnetic tapes obtained therefrom deteriorate with respect to the surfae properties, with resulting decreases in the surface glossiness, the loop squareness index (SQ) and the S/N ratio (color S/N ratio in particular).

Any binders and solvents generally used for the production of the coating type magnetic tapes may be used in kneading.

The binders used in the present invention include those known in the art such as, for instance, thermoplastic resins, thermosetting resins or reaction type resins, or mixtures thereof.

The thermoplastic resins used may have a mean molecular weight of 10,000 to 200,000 and a degree of polymerization of about 200 to 2,000, and may include, e.g., vinyl chloride-vinyl acetate copolymers, vinyl chloride-vinyl acetate-maleic acid copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluorides, vinylidene chloride-acrylonitrile copolymers, butadiene-acrylonitrile copolymers, polyamide resins, polyvinyl butyrals, cellulose derivatives (cellulose acetate butylate, cellulose diacetate, cellulose triacetate, cellulose propionate, nitrocellulose, cellulose acetate propionate, etc.), styrene-butadiene copolymers, polyester resins, thermoplastic resins based on various synthetic rubber (polybutadiene, polychloroprene, polyisoprene, styrene-butadiene copolymers, etc.), and mixtures thereof.

The thermosetting or reaction type resins used have a molecular weight of no higher than 200,000 in the state of coating liquid, and upon being added, after coating and drying their molecular weight is increased to infinity due to combining, addition and like reactions.

Among others, particular preference is given to resins that do neither soften nor melt by the time they decompose thermally. Concretely speaking, there are for instance phenol-formalin-novolak resins, phenol-formalin-resol resins, phenol-furfural resins, xylene-formalin resins, urea resins, melamine resins, dry oil-modified alkyd resins, carbolic acid resin-modified alkyd resins, maleic acid resin-modified alkyd resins, unsaturated polyester resins, epoxy resins and setting agents (polyamine, acid anhydrides, polyamide resins and others), isocyanate-terminated polyester moisture-setting type resins, isocyanate-terminated polyether moisture-setting type resins, polyisocyanate prepolymers (compounds obtained by the reaction of diisocyanates with low-molecular triols and having at least three isocyanate group in one molecule, trimer and tetramers of diisocyanates), resins containing polyisocyanate prepolymers and active hydrogen (polyester polyols, polyether polyols, acrylic acid copolymers, maleic acid copolymers, 2-hydroxyethyl methacrylate copolymers, parahydroxystyrene copolymer and others), and mixtures thereof. These binders may be used alone or in combination along with additives. In general, however, use is made of vinyl chloride-vinyl acetate copolymers, polyurethane resins, cellulose derivatives and the like.

Appropriately, the binder(s) is (or are) used in an amount of 15 or 40 parts by weight (preferably 16 to 35 parts by weight) per 100 parts by weight of the ferromagnetic alloy powder.

As the binder used for pre-dispersion, use may be made of resins free from any functional group, which reacts with moisture in the dispersion to coagulate or agglomerate, such as vinyl chloride-vinyl acetate copolymers, cellulose derivatives, safe urethane resins and the like in an amount of preferably 5 to 15 parts by weight per 100 parts by weight of the ferromagnetic alloy powder. For the mixing and dispersion of additional binder, use may be made of binders identical to or different from those used for the pre-dispersion in an appropriately adjusted amount. The dispersion by mixing is desirously effected in two stages. In this case, a resin having reactivity with respect to moisture such as polyisocyanates is mixed in the final stage.

The solvents used in the present invention include acetone, ketones such as methyl ethyl ketone, methyl isobutyl ketone, ethyl isobutyl ketone, cyclohexanone and the like; esters such as methyl acetate, ethyl acetate, butyl acetate, glycol acetate monoethyl ether and the like; glycol ethers such as ether, glycol dimethyl ether, dioxane and the like, aromatic hydrocarbons such as benzene, toluene, xylene and the like; and chlorinated hydrocarbons such as methylene chloride, ethylene chloride, ethylene chlorohydrin, carbon tetrachloride, chloroform, dichlorobenzene and the like, the foregoing being used alone or in combination. If possible, nonpolar solvents are preferably used, since satisfactory kneading is then achieved.

As the binders and solvents, commercially available products may be used without dehydration, but they should preferably have a reduced water content (of, e.g., no higher than 1.0% by weight).

The second step used involves coating of the kneaded and dispersed coating liquid onto the nonmagnetic supporting substrate. The methods used to coat the magnetic layer onto the nonmagnetic supporting substrate embrace air doctor coating, blade coating, rod coating, extrusion coating, air knife coating, squeeze-coating, impregnation coating, reverse-roll coating, transfer-roll coating, gravure coating, kiss-roll coating, cast coating, spray coating, spin coating and the like, and other like methods. For the concrete and detailed explanation thereof, see "COATING ENGINEERING" pages 253 to 277, Mar. 20, 1971, Asakura Shoten.

Referring to multi-layer magnetic recording media, the magnetic layer is coated onto the nonmagnetic supporting substrate by the aforesaid coating methods, followed by drying. This step is continuously repeated to form two or more magnetic layers. As described in Japanese Patent Kokai-Publication Nos. 48-98803 (West German Patent DT-OS No. 2,309,159) and 48-99233 (West German Patent DT-AS No. 2,309,158) and the like, two or more magnetic layers may be simultaneously formed by the simultaneous multi-layer coating method.

Coating is effected in such a manner that the thickness of the magnetic layer falls in the range of about 0.5 to 12 microns on the dry basis. In the case of the multi-layer magnetic layer, the total thickness thereof should also fall in the aforesaid range. The dry thickness should be determined according to the use, shape and standard of the magnetic recording media.

After the magnetic layer coated onto the supporting substrate by such methods has been treated to orientate the magnetic powders therein, if necessary, the thus formed magnetic layer is dried. If necessary, the thus dried layer may be subjected to a surface-smoothening treatment, or may be cut into the desired shape for the production of the magnetic recording media according to the present invention.

In particular, it has been found that the magnetic recording media having a smooth surface and excelling in wear resistance can be obtained by subjecting the magnetic recording layers to the surface-smoothening treatment according to the present invention. The surface-smoothening treatment is achieved by smoothening before drying, or by calendering after drying.

In accordance with the present invention, it is possible to obtain the magnetic tapes having improved dispersibility, high loop squareness indices (SQ) and high S/N ratios by producing the magnetic recording media by means of the aforesaid steps.

The magnetic recording media of the present invention may otherwise be prepared according to the materials and production method as described in Japanese Patent Kokai-Publication No. 52-108804.

EXAMPLES

In the following, the present invention will more concretely be explained with reference to the examples, wherein "parts" means "parts by weight".

EXAMPLES 1-5

Ferromagnetic alloy powders were exposed to a nitrogen atmosphere containing the given moisture for the given time to thereby obtain the ferromagnetic alloy powders having a water content of 0.1 to 1.2% by weight (described in Table 1).

The following formulations obtained by using the aforesaid powders were kneaded for 2 hours by means of a batch type kneader for pre-dispersion. Subsequently, the resulting mixtures were diluted with solvents, added with additonal binders, and mixed and dispersed together with the use of sand bead media by means of a sand grinder.

FORMULATIONS FOR PRE-DISPERSION

Ferromagnetic Alloy Powders: 100 parts
(Fe-Ni alloy, Ni: about 5% by weight)
(Specific Surface Area and Water Content: described in Table 1)

CARBOXYL GROUP-CONTAINING VINYL CHLORIDE-VINYL

Acetate Copolymer: 10 parts
Carbon Black: 3 parts
Methyl Ethyl Ketone: 50 parts

FORMULATIONS FOR MIXING AND DISPERSION

Pre-Dispersion Liquid: 163 parts
Urethane Resin: 6 parts
Butyl Stearate: 1 part
$Cr_2O_3$: 2 parts
Methyl Ethyl Ketone: 200 parts Each mixed and dispersed liquid was formulated into a coating liquid with the components as mentioned below, and was coated into a dry thickness of 5 microns onto a polyethylene terephthalate base by means of reverse-roll coating, followed by drying. The resultant products were smoothened on the surfaces, and measured on their surface gloss, loop squareness indices and wearing loss of heads.

FORMULATIONS OF FINAL COATING LIQUID

Mixed and Dispersed Liquid: 372 parts
Stearic Acid: 1 part
Oleic Acid: 1 part
Polyisocyanate: 10 parts
("Colonate L" manufactured by Nippon Polyurethane Co., Ltd.)

The obtained results (examples) are set forth in Table 1.

COMPARISON EXAMPLES 1-2

For comparison, the procedures of the examples were repeated, provided that the ferromagnetic alloy powders used had a specific surface area ($S_{BET}$) and water content departing from the ranges defined in the present invention. Measurement was made of the surface gloss, loop squareness index and wearing loss of heads. The obtained results (comparison examples) are set forth in Table 1.

The physical properties of the ferromagnetic powders and the characteristics of the magnetic tapes were measured by the following methods.

MEASUREMENT OF SURFACE GLOSSINESS OF THE MAGNETIC LAYER

Measurement was effected according to JIS Z8741, and the mirror-surface glossiness of the surface of glass having a refractive index of 1.567 was taken as 100% at an incident angle of 45°.

MEASUREMENT OF THE WATER CONTENT OF THE FERROMAGNETIC ALLOY POWDER

With a slight water content measuring device CA-02 type manufactured by Mitsubishi Chemical Industries, Ltd., water contents (g) per 100 g of the ferromagnetic alloy powders were determined at a vaporization temperature of 120° C. on the basis of the principle of the Karl Fischer method.

MEASUREMENT OF THE LOOP SQUARENESS INDEX

Br/Bm was determined at Hm 5 kOe with the use of a vibration sample type magnetic flux meter (Toei Kogyo Co., Ltd.).

MEASUREMENT OF THE AMOUNT OF HEAD WEAR

The wear amount of the head (in microns) was measured on a VHS type VTR (NV-8700) after 100-hours of running.

As can be appreciated from the foregoing examples, the products belonging to the purport of the present invention show such significant effects that the gloss is improved (improvements in the smoothness), the loop squareness index is increased, and the head's wear amount is reduced or improved. These are achieved by controlling the specific surface area and absorbed water content of the ferromagnetic alloy powders according to the predetermined values.

According to the present invention, it is possible to produce the most effective magnetic recording media having therein the most completely dispersed alloy powders by pre-dispersion of the foregoing ferromagnetic alloy powders and binder, followed by mixing and dispersion of an additional binder.

It should be understood that modification may be made without departing from the gist of the present invention as disclosed hereinabove and defined in the following claims.

ferromagnetic alloy powder-containing magnetic layer applied onto the surface thereof, characterized by comprising the steps of:

pre-dispersing a ferromagnetic alloy powder with and in a binder, said alloy powder having a specific surface area ($S_{BET}$) of no less than 45 m$^2$/g and an absorbed water content of no higher than 1.2% by weight resulting in a pre-dispersion;

mixing and dispersing an additional binder with and in the pre-dispersion; and coating the resultant mixed and dispersed magnetic coating liquid onto said nonmagnetic supporting substrate.

3. The magnetic recording medium as defined in claim 1, wherein the absorbed water content of said ferromagnetic alloy powder is 0.1–1.0% by weight.

4. The magnetic recording medium as defined in claim 1, wherein the binder amounts to 15–40 parts by weight per 100 parts by weight of the ferromagnetic alloy powder.

5. The process as defined in claim 2, wherein the absorbed water of said ferromagnetic alloy powder is 0.1–1.0% by weight.

6. The process as defined in claim 2, wherein the binder to be used at the pre-dispersing step amounts to 5–15 parts by weight per 100 parts by weight of the ferromagnetic alloy powder.

7. The process as defined in claim 2, wherein the binder to be used at the pre-dispersing step is a resin which is free of any functional group reacting with moisture.

8. The process as defined in claim 7, wherein said binder is one or more selected from the group consisting

TABLE 1

| | Results of Measurement — Properties Measured | | | | |
|---|---|---|---|---|---|
| Samples | Specific Surface Area of Ferromagnetic Alloy Powder ($S_{BET}$) (m$^2$/g) | Moisture Content (%) | Gloss (%) | Loop Squareness Index | Wearing Loss of Head ($\mu$m) |
| Example 1 | 45 | 1.2 | 265 | 0.76 | 1.5 |
| Example 2 | " | 1.0 | 270 | 0.78 | 1.2 |
| Example 3 | " | 0.6 | 275 | 0.78 | 1.0 |
| Example 4 | " | 0.1 | 270 | 0.78 | 1.2 |
| Example 5 | 50 | 1.0 | 275 | 0.75 | 1.0 |
| Comparative Example 1 | 45 | 1.5 | 240 | 0.70 | 8.0 |
| Comparative Example 2 | 40 | " | 240 | 0.76 | 8.0 |
| Comparative Example 3 | " | 1.2 | 240 | 0.76 | 8.0 |

What is claimed is:

1. A magnetic recording medium comprising a nonmagnetic supporting substrate and a ferromagnetic alloy powder-containing magnetic layer applied onto the surface thereof with a binder, characterized in that said ferromagnetic alloy powder to be used has a specific surface area ($S_{BET}$) of no less than 45 m$^2$/g and an absorbed water content of no higher than 1.2% by weight.

2. A process for producing magnetic recording media comprising a nonmagnetic supporting substrate and a of vinyl chloride-vinyl acetate copolymer, cellulose derivatives and urethane resins.

9. The process as defined in claim 7, wherein the mixing and dispersing of the additional binder is effected in two stages, a resin reactive with moisture being admixed in the second stage.

10. The process as defined in claim 2, wherein said pre-dispersing step is carried out under such condition that shearing force can be applied.

* * * * *